United States Patent
Czajkowski et al.

(10) Patent No.: US 6,876,996 B2
(45) Date of Patent: Apr. 5, 2005

(54) METHOD AND APPARATUS FOR USING A SHARED LIBRARY MECHANISM TO FACILITATE SHARING OF METADATA

(75) Inventors: Grzegorz J. Czajkowski, Mountain View, CA (US); Laurent P. Daynes, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 425 days.

(21) Appl. No.: 10/102,318

(22) Filed: Mar. 19, 2002

(65) Prior Publication Data

US 2003/0093401 A1 May 15, 2003

Related U.S. Application Data

(60) Provisional application No. 60/332,924, filed on Nov. 14, 2001.

(51) Int. Cl.$^7$ .............................................. G06F 17/30
(52) U.S. Cl. ............................ 707/2; 707/101; 717/164
(58) Field of Search ............................... 717/147, 136, 717/156, 178, 144, 130, 139, 148, 164, 152; 707/1, 103, 200, 2, 101, 10, 104.1, 8; 709/229; 711/211, 213

(56) References Cited

U.S. PATENT DOCUMENTS

| | | | | |
|---|---|---|---|---|
| 5,075,847 A | * | 12/1991 | Fromme | 717/136 |
| 5,507,030 A | * | 4/1996 | Sites | 717/136 |
| 5,528,753 A | * | 6/1996 | Fortin | 714/35 |
| 5,649,203 A | * | 7/1997 | Sites | 717/156 |
| 5,652,889 A | * | 7/1997 | Sites | 717/144 |
| 5,655,073 A | * | 8/1997 | Nishikado et al. | 717/124 |
| 5,794,052 A | * | 8/1998 | Harding | 717/178 |
| 6,460,178 B1 | * | 10/2002 | Chan et al. | 717/147 |
| 6,662,356 B1 | * | 12/2003 | Edwards et al. | 717/113 |
| 6,665,671 B2 | * | 12/2003 | Coutant | 707/8 |
| 6,799,173 B2 | * | 9/2004 | Czajkowski et al. | 707/2 |

* cited by examiner

Primary Examiner—Jean M. Corrielus
(74) Attorney, Agent, or Firm—Park, Vaughan & Fleming, LLP (57) ABSTRACT

One embodiment of the present invention provides a system that uses a shared library to facilitate sharing objects containing metadata. During operation, the system receives identifiers for a set of objects to be included in the shared library. Next, the system generates a shared library containing the set of objects. In doing so, the system configures a symbol table within the shared library to include an identifier for each object. The system then installs the shared library in a file system, and configures the file system so that the shared library file can be accessed through a set of symbolic names, wherein each object is associated with a different symbolic name. This allows each object in the shared library to be referenced through its own symbolic name. Note that the present invention uses the shared library mechanism in a manner which differs from its typical use (sharing compiled, executable code). In order to avoid generating a shared library for each metadata object, the present invention places many such items together in one shared library. The names of these metadata objects are subsequently used as symbolic names of the file containing the shared library.

23 Claims, 5 Drawing Sheets

METHOD AND APPARATUS FOR USING A SHARED LIBRARY MECHANISM TO FACILITATE SHARING OF METADATA

RELATED APPLICATION

This application hereby claims priority under 35 U.S.C. §119 to U.S. Provisional Patent Application No. 60/332,924, filed on Nov. 14, 2001, entitled "Sharing Meta-Data Across Instances of a Language Run-Time System," by inventors Grzegorz J. Czajkowski and Laurent P. Daynes.

BACKGROUND

1. Field of the Invention

The present invention relates to operating systems for computers. More specifically, the present invention relates to a method and an apparatus that uses a shared library mechanism to facilitate sharing metadata, such as classes or compiled methods, between multiple instances of a language run-time system.

2. Related Art

It is often advantageous to share metadata, such as class files or dynamically compiled code, across multiple instances of a runtime system of a programming language, such as the Java Virtual Machine (JVM™). (The terms "Sun Microsystems", "Java", "Java virtual machine" and "JVM" are trademarks or registered trademarks of Sun Microsystems, Inc. in the United States and other countries.)

Sharing of metadata across multiple instances of a language runtime system can be accomplished by storing the metadata in a shared memory area. However, unless the metadata is read-only, such sharing means that there will exist periods of time when the shared memory area will be accessible for writing by the sharing processes. In some situations this does not create a problem. However, a bug in one of the instances or in a user-supplied native library may lead to uncontrolled writing in the shared memory area. This may cause the shared memory area to be corrupted for all processes, not just for the process that actually corrupted the shared memory area.

Another problem with using shared memory is that updates to the shared memory area have to be guarded by a concurrency control primitive, such as a monitor or a semaphore. If a process making an update (e.g., adding another piece of metadata) unexpectedly terminates during the update, the system must ensure that the relevant concurrency control objects are released in order to avoid preventing other processes from using the shared memory area.

Despite these challenges, sharing of metadata remains attractive because of its potential to decrease the memory footprint of virtual machines and to factor out costs related to on-demand class loading (e.g., parsing, verification, dynamic link resolution) and to architecture neutrality of class files (e.g., runtime quickening of interpreted code and runtime compilations).

What is needed is method and an apparatus that facilitates sharing of metadata between multiple virtual machines and/or processes in a manner that efficiently deals with the above-described challenges.

SUMMARY

One embodiment of the present invention provides a system that uses a shared library mechanism to facilitate sharing objects containing metadata. During operation, the system receives identifiers for a set of objects to be included in a shared library. Next, the system generates a shared library containing the set of objects. In doing so, the system configures a symbol table within the shared library to include an identifier for each object. The system then installs the shared library in a file system, and configures the file system so that the shared library file can be accessed through a set of symbolic names, wherein each object is associated with a different symbolic name. This allows each object in the shared library to be referenced through its own symbolic name.

Note that the present invention uses the shared library mechanism in a manner which differs from its typical use (sharing compiled, executable code). In order to avoid generating a shared library for each metadata object, the present invention places many such items together in one shared library. The names of these metadata objects are subsequently used as symbolic names of the file containing the shared library. In this way, fetching a metadata object "Obj" can be accomplished simply by opening shared library named Obj.

This use of shared libraries depends on the following property of shared libraries (present in several commercially available operating systems): loading the same shared library via different symbolic names by a process results in loading it only once by this process: the first load actually loads the library, and subsequent loads return the handle to the previously loaded library.

In a variation on the above embodiment, generating the shared library involves placing ready-only portions of objects in a read-only region of the shared library, and placing writeable portions of objects in a writeable region of the shared library.

In a variation on this embodiment, the system enforces a copy-on-write policy by ensuring that a write operation to a data item in the writeable region of the shared library is restricted to a local copy of the data item in the local address space of a process that issued the write operation.

In a variation on this embodiment, an object in the set of objects defines a class containing methods to be shared between instances of a language run-time system.

In a variation on this embodiment, an object in the set of objects contains dynamically compiled code to be shared between instances of a language run-time system.

In a variation on this embodiment, the system accesses a target object in the shared library by accessing the shared library through a symbolic name associated with the target object, and then looking up the target object in the symbol table of the shared library to determine a location of the target object within the shared library.

In a variation on this embodiment, a symbolic name for an object can be inferred from the identifier for the object.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Computer System

Figure 1:
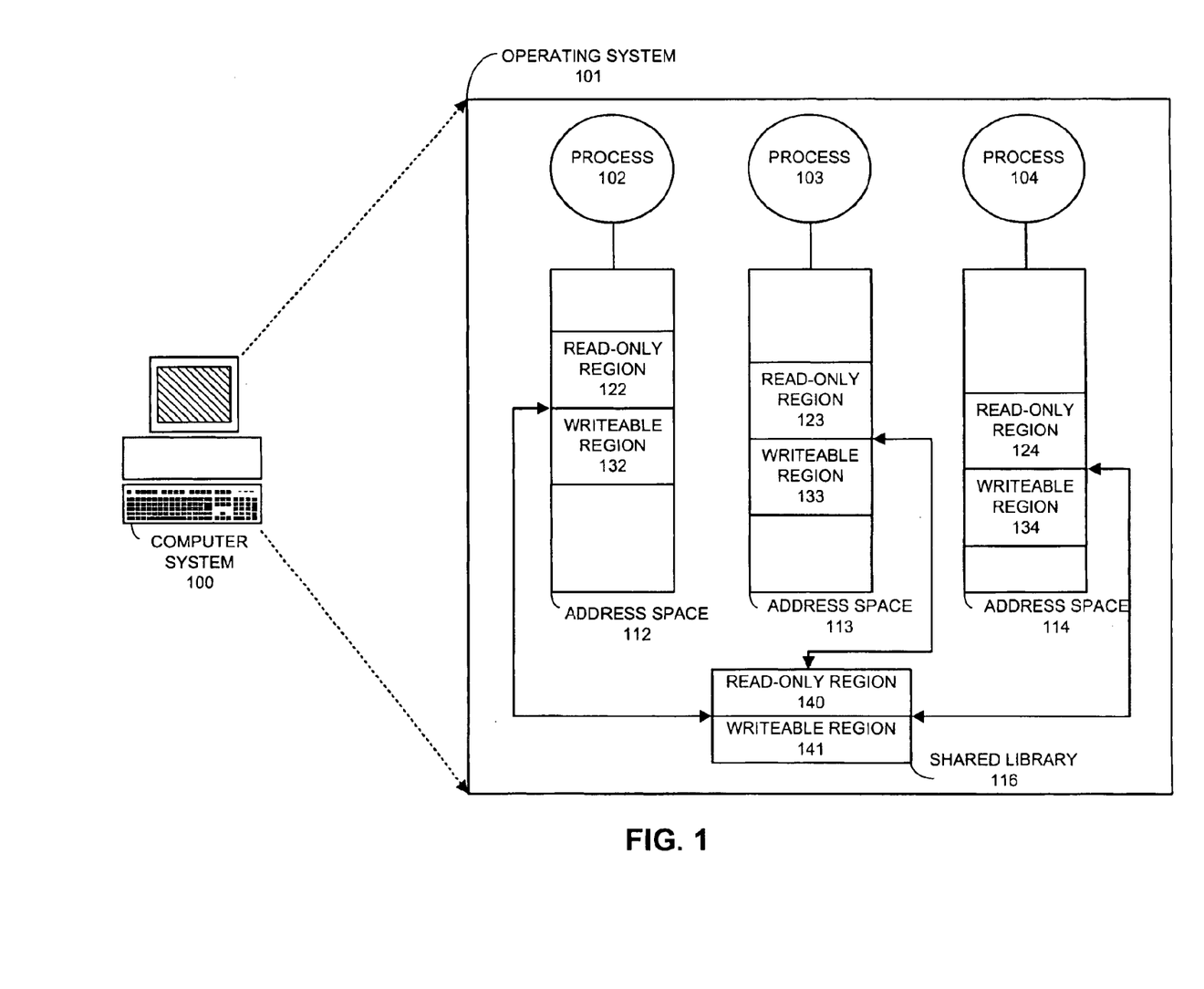
FIG. 1 illustrates a computer system in accordance with an embodiment of the present invention.

FIG. 1 illustrates a computer system 100 in accordance with an embodiment of the present invention. Computer system 100 can generally include any type of computer system that can support multiple processes, including, but not limited to, a computer system based on a microprocessor, a mainframe computer, a digital signal processor, a portable computing device, a personal organizer, a device controller, and a computational engine within an appliance. Computer system 100 can also include any type of computer system that supports communications between parallel processors, such as a multiprocessor system or certain types of distributed computer systems.

Computer system 100 contains an operating system 101, which supports a number of processes 102–104 that can share metadata located in shared library 116. Each of these processes 102–104 operates within its own virtual address space. In particular, process 102 operates on address space 112, process 103 operates on address space 113, and process 104 operates on address space 114. In one embodiment of the present invention, processes 102–104 execute separate instances of a language runtime system, such as the Java Virtual Machine.

Operating system 101 also supports a shared library mechanism. Each shared library may include a read-only region 140 as well as a writeable region 141. Shared library 116 implements a copy-on-write policy. This means for example, if process 102 attempts to write to a page in writeable region 141 of shared library 116, a local copy of the page is created in the local address space 112 for process 102. The write operation is then applied only to the local copy of the page, and does not propagate to other versions of the page. Hence, shared library 116 ensures that read-only region 140 cannot be corrupted (because it cannot be written to) and that erroneous writes to writeable region 141 will only corrupt corresponding memory in the address space of the process that issued the writes.

Regions of shared library 116 are mapped into local address spaces 112–114. More specifically, read-only region 140 of shared library 116 is mapped into read-only region 122 of local address space 112, and writeable region 141 of shared library 116 is mapped into writeable region 132 of local address space 112. Similarly, read-only region 140 of shared library 116 is mapped into read-only region 123 of local address space 112, and writeable region 141 of shared library 116 is mapped into writeable region 133 of local address space 112. Finally, read-only region 140 of shared library 116 is mapped into read-only region 124 of local address space 112, and writeable region 141 of shared library 116 is mapped into writeable region 134 of local address space 112.

Shared Library

Figure 2:
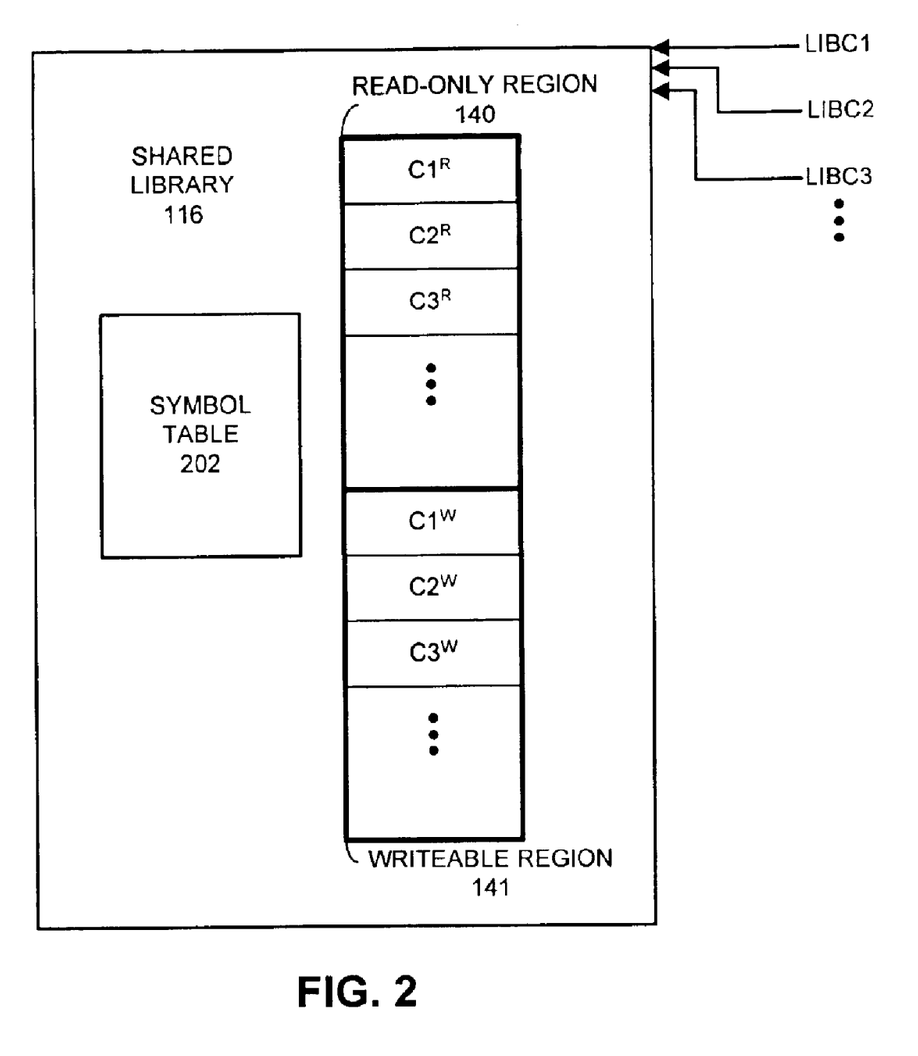
FIG. 2 illustrates a shared library in accordance with an embodiment of the present invention.

FIG. 2 illustrates the structure of shared library 116 in accordance with an embodiment of the present invention. Shared library 116 contains a number of objects C1, C2, C3, which, for example, can define Java classes. Each of these classes has a read-only portion, which is stored in read-only region 140 of shared library 116, and a writeable portion, which is stored writeable region 141 of shared library 116. More specifically, objects C1, C2 and C3 have read-only portions $C1^R$, $C2^R$ and $C3^R$, which are stored in read-only region 140, as well as writeable portions $C1^W$, $C2^W$ and $C3^W$, which are stored in writeable region 141.

Shared library 116 also includes a symbol table 202, which functions as an index to facilitate looking up the read-only and writeable portions of objects within shared library 116.

Shared library 116 can be referenced through many different names (via symbolic links) to facilitate easily referencing a library containing the required metadata. For example, if classes C1, C2 and C3 are stored in shared library 116, shared library 116 can be accessed through corresponding symbolic names: LibC1, LibC2 and LibC3.

Note that modern operating systems typically have the following property, which the present invention takes advantage of: loading the same shared library via different symbolic names by a process results in loading it only once by this process: the first load actually loads the library, and subsequent loads return the handle to the previously loaded library. This is important because it avoids having to maintain a mapping from metadata object names to library names; such a mapping can be costly in terms of time and/or space.

In order to use multiple symbolic names to access shared library 116, it is advantageous for the implementation of shared library 116 to have the following property: after shared library 116 has been loaded by a process, subsequent requests to load shared library 116 under different symbolic names by the same process result in returning a handle to the originally loaded shared library. Otherwise, another naming scheme (not using symbolic links) may have to be used to store multiple metadata objects in the same shared library.

Note that storing multiple metadata objects in the same shared library avoids internal fragmentation that arises when page size is relatively large compared to a typical size of an instance of a metadata object.

Process of Loading a Shared Library

Figure 3A:
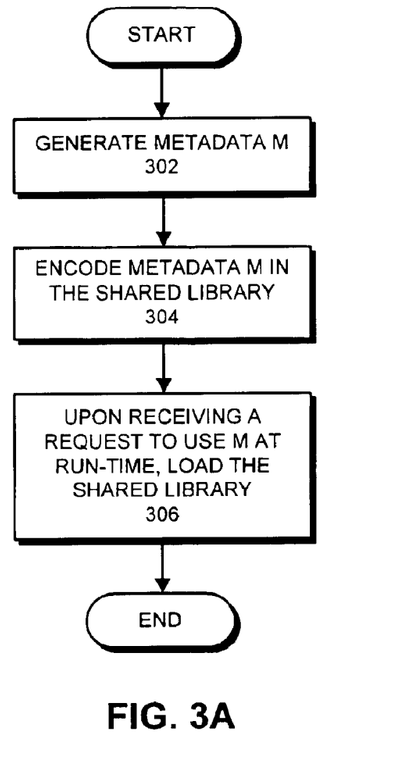
FIG. 3A is a flow chart illustrating how a shared library can be created in accordance with an embodiment of the present invention.

FIG. 3A is a flow chart illustrating how a shared library can be created in accordance with an embodiment of the present invention. In this embodiment, a metadata object, M, is generated off-line prior to its use, for example during a compilation stage (step 302). Metadata object M is then encoded into shared library 116 (step 304). Note that this encoding process computes both a read-only portion, $M_R$, and a writeable portion, $M_W$, of the metadata object M. During execution of a runtime system, a request to use metadata object M is satisfied by loading shared library 116 into the runtime system (step 306).

Figure 3B:
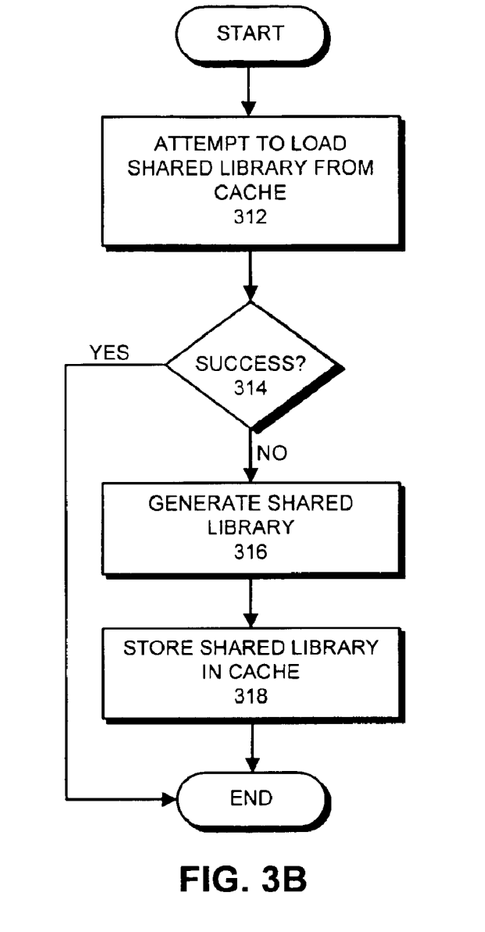
FIG. 3B is a flow chart illustrating how a shared library is loaded or created in accordance with another embodiment of the present invention.

Another way to use shared library 116 is illustrated in the flow chart that appears in FIG. 3B. First, an instance of a run-time system attempts to load shared library 116 from a cache containing shared libraries (step 312). For example, the cache can be a directory in a file system containing all the shared libraries that contain metadata. If the attempt is successful, shared library 116 is loaded and the process is complete.

Otherwise, if the attempt is not successful, the instance of the run-time system generates shared library 116 (step 316) and then stores shared library 116 into the cache (step 318).

Shared Library Generation

Figure 4:
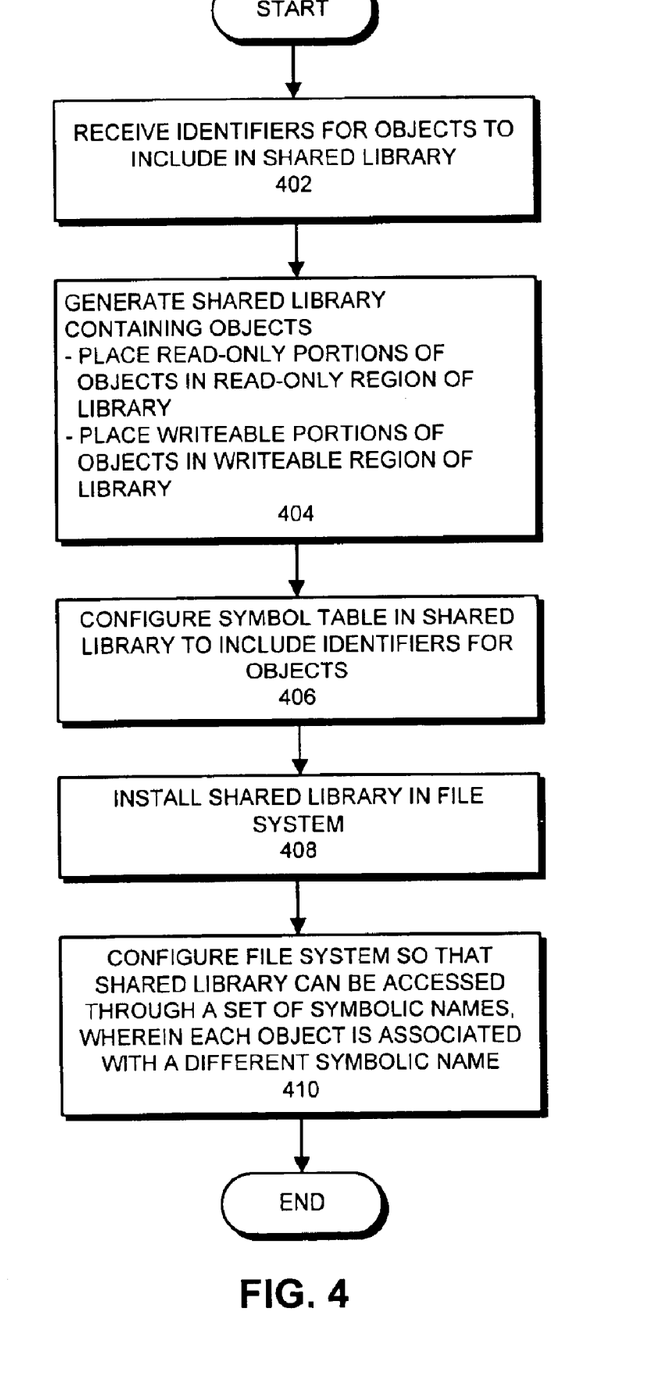
FIG. 4 is a flow chart illustrating the process of generating and configuring a shared library in accordance with an embodiment of the present invention.

FIG. 4 is a flow chart illustrating the process of generating and configuring a shared library in accordance with an embodiment of the present invention. This process can take place either offline prior to the library's use, or alternatively at runtime.

The system starts by receiving identifiers for a list of objects to be included in the shared library (step 402). Next, the system generates a shared library 116 containing the objects (step 404). During this process, the system places read-only portions of objects in the read-only region 140 of shared library 116, and places writeable portions of objects in the writeable region 141 of shared library 116.

Next, the system configures symbol table 202 in shared library 116 to include identifiers for the objects (step 406). This facilitates looking up locations of the objects within shared library 116.

Next, the system installs shared library 116 into the file system (step 408). The system also configures the file system so that shared library 116 can be accessed through a set of symbolic names LibC1, LibC2 and LibC3 (step 410). Note that each object is associated with a different symbolic name, which can be inferred from the name of the object. For example, the shared library 116 containing object C1 can be reference through the symbolic name LibC1 (see FIG. 2). Note that this technique uses the existing symbolic linking mechanism of a file system to facilitate referencing a shared library containing an object without having to keep track of which shared library contains the object.

Process of Accessing an Object from a Shared Library

Figure 5:
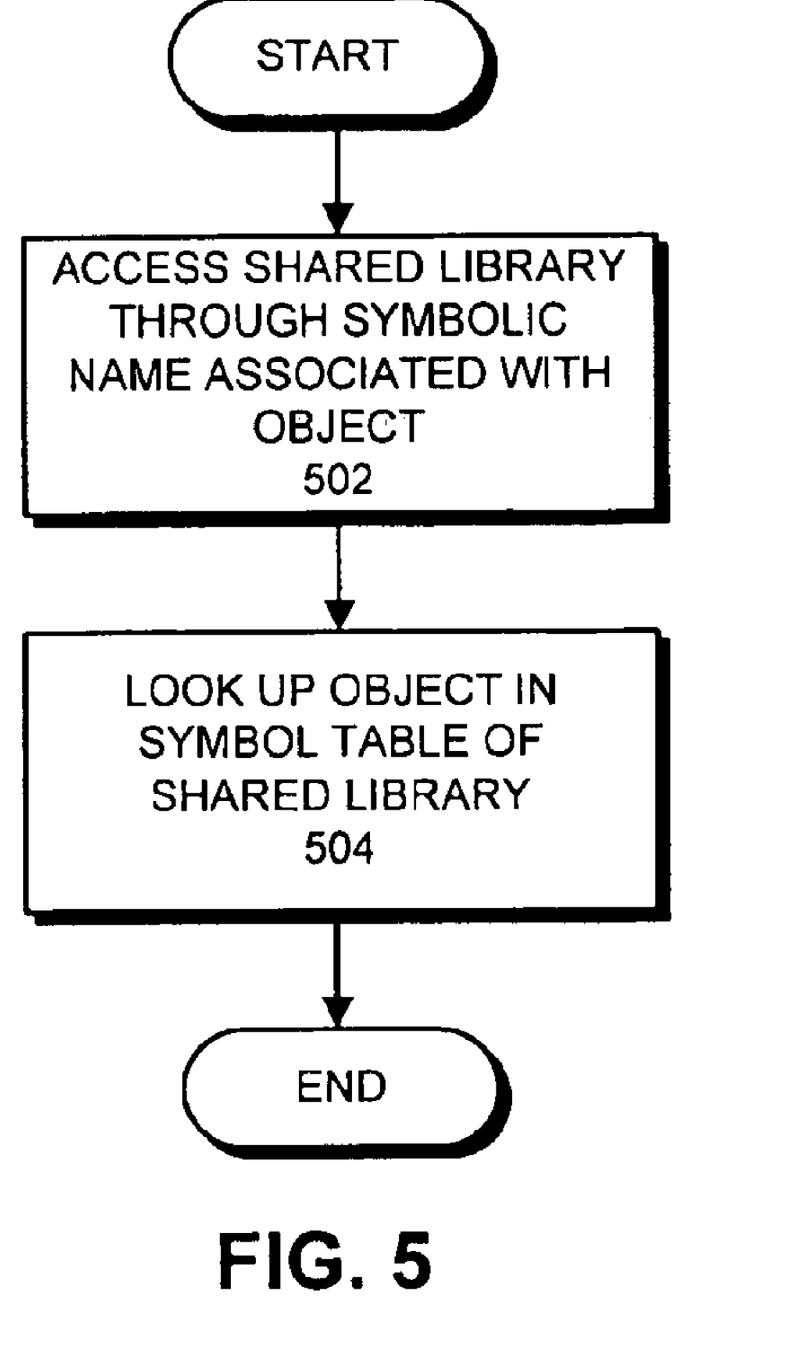
FIG. 5 is a flow chart illustrating the process of accessing an object within a shared library in accordance with an embodiment of the present invention.

FIG. 5 is a flow chart illustrating the process of accessing an object within a shared library 116 in accordance with an embodiment of the present invention. In order to access an object, the system first accesses the shared library containing the object through the symbolic name associated with the object (step 502). For example, in order to access class C2, the system first accesses shared library 116 through an associated symbolic link LibC2 that points to shared library 116 (see FIG. 2). Next, the system looks up the object in the symbol table for the shared library (step 504). For example, the system can lookup class C2 in symbol table 202 in shared library 116 to return the locations for read-only portion, $C2^R$, and the writeable portion, $C2^W$, of class C2 (see FIG. 2).

Note that the above-described technique of using a shared library to store metadata provides the benefits of using a separate custom-managed shared memory area for sharing metadata, since physical memory containing parts of shared libraries are shared among all processes which have loaded a given shared library, thus lowering memory footprint.

Moreover, the copy-on-write mechanism of the shared library eliminates the problem of memory corruption problems between processes.

Furthermore, the above-described use of multiple symbolic links simplifies the process of referencing a shared library containing an object.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method that uses a shared library mechanism to facilitate sharing objects, comprising:

receiving indentifiers for a set of objects to be included in a shared library, wherein an object in the set objects contains dynamically compiled code to be shared between multiple instances of a language run-time system;

generating the shared library containing the set of objects;

configuring a symbol table within the shared library to include an indentifier for each object in the set of objects;

installing the shared library in a file system; and configuring the file system so that the shared library can be accessed through a set of symbolic names, wherein file system is configured to load the shared library via different symbolic names in the set of symbolic names so that a first load actually loads the shared library, and subsequent loads return a handled to the previously loaded library, and wherein each object in the shared library is associated with a different symbolic name, so that each object can be referenced through its own symbolic name.

2. The method of claim 1, wherein generating the shared library involves:

placing read-only portions of objects in a read-only region of the shared library; and placing writeable portions of objects in a writeable region of the shared library.

3. The method of claim 2, further comprising enforcing a copy-on-write policy by ensuring that a write operation to a data item in the writeable region of the shared library is restricted to a local copy of the data item in a local address space of a process that issued the write operation.

4. The method of claim 1, wherein an object in the set of objects defines a class containing methods to be shared between instances of a language run-time system.

5. The method of claim 1, further comprising accessing a target object in the shared library by:

accessing the shared library through a symbolic name associated with the target object; and looking up the target object in the symbol table of the shared library to determine a location of the target object within the shared library.

6. The method of claim 1, wherein a symbolic names for an object can be inferred from the indentifier for the object.

7. A computer-readable storage medium storing instructions that when executed by a computer cause the computer to perform a method that uses a shared library mechanism to facilitate sharing objects, the method comprising:

receiving indentifiers for a set of objects to be included in the shared library, wherein an object in the set of objects contains dynamically compiled code to be shared between multiple instances of a language run-time system;

generating a shared library containing the set of objects;

configuring a symbol table within the shared library to include an identifier for each object in the set of objects;

installing the shared library in a file system; and configuring the file system so that the shared library can be accessed through a set of symbolic names, wherein file system is configured to load the shared library via different symbolic names in the set of symbolic names so that a first load actually loads the shared library, and subsequent loads return a handled to the previously loaded library, and wherein each object in the shared library is associated with a different symbolic name, so that each object can be referenced through its own symbolic names.

8. The computer-readable storage medium of claim 7, wherein generating the shared library involves:

placing read-only portions of objects in a read-only region of the shared library; and placing writeable portions of objects in a writeable region of the shared library.

9. The computer-readable storage medium of claim 8, wherein the method further comprises enforcing a copy-on-write policy by ensuring that a write operation to a data item in the writeable region of the shared library is restricted to a local copy of the data item in a local address space of a process that issued the write operation.

10. The computer-readable storage medium of claim 7, wherein an object in the set of objects defines a class containing methods to be shared between instances of a language run-time system.

11. The computer-readable storage medium of claim 7, wherein the method further comprises accessing a target object in the shared library by:

accessing the shared library through a symbolic name associated with the target object; and looking up the target object in the symbol table of the shared library to determine a location of the target object within that shared library.

12. The computer-readable storage medium of claim 7, wherein a symbolic name for an object can be inferred from the identifier for the object.

13. An apparatus that uses a shared library mechanism to facilitate sharing objects, comprising a library generation mechanism that is configured to generate a shared library, wherein the shared library contains a set of objects, wherein an object in the set of objects contains dynamically compiled code to be shared between instances of a language run-time system;

wherein the library generation mechanism is configured to populate a symbol table within the shared library to include an identifier for each object in the set of objects; and a library installation mechanism that is configured to install the shared library in a file system;

wherein library installation mechanism is configure to load the shared library via different symbolic names in the set of symbolic names so that a first load actually loads the shared library, and subsequent loads return a handled to the previously loaded library;

wherein the library installation mechanism is configured to update the file system so that the shared library can be accessed through a set of symbolic names; and wherein each object in the shared library is associated with a different symbolic name, so that each object can be referenced through its own symbolic name.

14. The apparatus of claim 13, wherein the library generation mechanism is configured to:

place read-only portions of objects in a read-only region of the shared library; and to place writeable portions of objects in a writeable region of the shared library.

15. The apparatus of claim 14, further comprising a copy-on-write mechanism, which ensures that a write operation to a data item in the writeable region of the shared library is restricted to a local copy of the data item in a local address space of a process that issued the write operation.

16. The apparatus of claim 13, wherein an object in the set of objects defines a class containing methods to be shared between instances of a language run-time system.

17. The apparatus of claim 13, further comprising a library access mechanism that is configured to:

accessing a target object in the shared library through a symbolic name associated with the target object; and to look up the target object in the symbol table of the shared library to determine a location of the target object within the shared library.

18. The apparatus of claim 13, wherein a symbolic name for an object can be inferred from the identifier for the object.

19. A computer system that uses a shared library to facilitate sharing objects, comprising:

a file system;

the shared library with the file system that contains a set of objects, wherein an object in the set of objects contains dynamically compiled code to be shared between multiple instances of a language run-time system; and a symbol table within the shared library that includes an identifier for each object in the set of objects;

wherein the file system is configured so that the shared library can be accessed through a set of symbolic names;

wherein file system is configured to load the shared library via different symbolic names in the set of symbolic names so that a first load actually loads the shared library, and subsequent loads return a handled to the previously loaded library; and wherein each object in the shared library is associated with a different symbolic name, so that each object can be referenced through its own symbolic name.

20. The computer system of claim 19, wherein shared library includes a read only section containing read-only portions of objects; and a writeable section containing writeable portions of objects.

21. The computer system of claim 20, wherein the shared library includes a copy-on-write mechanism, which ensures that a write operation to a data item in the writeable section of the shared library is restricted to a local copy of the data item in a local address space of a process that issued the write operation.

22. The computer system of claim 19, wherein an object in the set of objects defines a class containing methods to be shared between instances of a language run-time system.

23. The computer system of claim 19, wherein a symbolic name for an object can be inferred from the identifier for the object.

* * * * *

UNITED STATES PATENT AND TRADEMARK OFFICE
CERTIFICATE OF CORRECTION

PATENT NO. : 6,876,996 B2
DATED : April 5, 2005
INVENTOR(S) : Grzegorz J. Czaijkowski It is certified that error appears in the above-identified patent and that said Letters Patent is hereby corrected as shown below:

Column 6,
Line 14, between the words "set objects" please insert the word, -- of --.
Line 29, please delete the word, "handled" and replace with the word -- handle --.
Line 56, please delete the word, "names" and replace with the word -- name --.

Column 7,
Lines 9 and 61, please delete the word, "handled" and replace with the word -- handle --.

Column 8,
Line 43, please delete the word, "handled" and replace with the word -- handle --.

Signed and Sealed this

Seventh Day of June, 2005

JON W. DUDAS
*Director of the United States Patent and Trademark Office*